United States Patent
Matsuda

(10) Patent No.: US 8,389,610 B2
(45) Date of Patent: Mar. 5, 2013

(54) RUBBER COMPOSITION FOR COATING A STEEL WIRE MATERIAL

(75) Inventor: Takashi Matsuda, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 251 days.

(21) Appl. No.: 12/834,487

(22) Filed: Jul. 12, 2010

(65) Prior Publication Data

US 2011/0028596 A1 Feb. 3, 2011

(30) Foreign Application Priority Data

Aug. 3, 2009 (JP) ................................. 2009-180441

(51) Int. Cl.
*C03C 25/26* (2006.01)
(52) U.S. Cl. ........ 524/228; 524/571; 152/537; 152/547; 152/548; 428/378
(58) Field of Classification Search ................... 524/228, 524/227, 81, 284, 186
See application file for complete search history.

(56) References Cited

U.S. PATENT DOCUMENTS

| | | | | |
|---|---|---|---|---|
| 4,551,391 A | * | 11/1985 | Kang et al. | 428/462 |
| 5,679,813 A | * | 10/1997 | Tate et al. | 556/7 |
| 2006/0180258 A1 | * | 8/2006 | Miyazaki et al. | 152/537 |

FOREIGN PATENT DOCUMENTS

| | | | | |
|---|---|---|---|---|
| JP | 56-047440 A | * | 4/1981 | |
| JP | 04-039340 | | 2/1992 | |
| JP | 4338767 B | * | 7/2009 | |
| JP | 4364299 B | * | 8/2009 | |

OTHER PUBLICATIONS

JP 56047440 A (Goto et al.). World Patents Index [online]. London, U.K.: Derwent Publications, Ltd. [retrieved on May 22, 2012]. Retreived from: EAST. DW198747, Accession No. 1981-44838D.*

* cited by examiner

*Primary Examiner* — David W Wu
*Assistant Examiner* — Josephine L. Chang
(74) *Attorney, Agent, or Firm* — Thorpe North & Western LLP

(57) ABSTRACT

A rubber composition is provided for coating a steel wire material having initial adhesion strength and water resistant adhesion strength with respect to a steel wire material at or above conventional levels, the rubber composition being compounded with a compound derived from a natural product. Specifically a rubber composition for coating a steel wire material is compounded with from 0.05 to 10 parts by weight of a salt compound per 100 parts by weight of a diene rubber, the salt compound including a dicarboxylic acid derived from a natural product and an amine of a decarboxylated amino acid derived from a natural product.

9 Claims, No Drawings

RUBBER COMPOSITION FOR COATING A STEEL WIRE MATERIAL

PRIORITY CLAIM

This application is based upon and claims the benefit of priority from Japanese Patent Application No. 2009-180441, filed Aug. 3, 2009, the entire contents of which is incorporated herein by reference.

BACKGROUND

1. Technical Field

The present invention relates to a rubber composition for coating a steel wire material and more particularly relates to a rubber composition for coating a steel wire material having initial adhesion strength and water resistant adhesion strength with respect to a steel wire material at or above conventional levels, while being compounded with a compound derived from a natural product.

2. Related Art

Generally, in pneumatic tires, carcass layers and belt layers reinforced by steel wire materials are formed from reinforced rubber sheets having a plurality of steel wires twisted together to form steel cords and a plurality of the steel cords laid out and coated with rubber. Additionally, bead cores are formed from a reinforced rubber compound body having single steel wires coated with rubber and a plurality of these coated wires bundled together. The rubber composition for coating a steel wire material used in these components must both have superior initial adhesion strength and water resistant adhesion strength with respect to the steel wire material.

Japanese Unexamined Patent Application No. H04-39340 proposes compounding a cresol resin, a partial condensate of hexamethylolmelaminepentamethyl ether, organic acid cobalt salt, and the like in order to improve both initial adhesion strength and water resistant adhesion strength with respect to a steel wire material. However, cresol resins and partial condensates of hexamethylolmelaminepentamethyl ether are petroleum-based materials and use of these is not preferable from a standpoint of environmental issues such as restrictions on carbon dioxide emissions that have been enacted in recent years. Replacing such materials with non-petroleum based materials (compounds derived from natural products) that have little impact on the environment is desired.

However, conventionally, compounds derived from natural products (adhesion aids) for use as rubber compounds for coating steel wire materials that have an effect of increasing both the initial adhesion strength and the water resistant adhesion strength thereof have not been discovered.

SUMMARY

An object of the present invention is to provide a rubber composition for coating a steel wire material having initial adhesion strength and water resistant adhesion strength with respect to a steel wire material at or above conventional levels, while being compounded with a compound derived from a natural product.

To achieve the above object, a rubber composition for coating a steel wire material of the present invention is compounded with from 0.05 to 10 parts by weight of a salt compound per 100 parts by weight of a diene rubber, the salt compound including a dicarboxylic acid derived from a natural product and an amine of a decarboxylated amino acid derived from a natural product.

Putrescine or cadaverine is favorably used as the amine and succinic acid is favorably used as the dicarboxylic acid.

The rubber composition for coating a steel wire material is favorable for use in a configuration in which a reinforced rubber sheet is formed by coating a plurality of laid-out steel cords with the rubber composition for coating a steel wire material. The reinforced rubber sheet can be favorably used as a carcass layer and/or a belt layer of a pneumatic tire.

Additionally, the rubber composition for coating a steel wire material is favorable for use in a configuration in which a reinforced rubber compound body is formed by coating single steel wires with the rubber composition for coating a steel wire material and bundling a plurality thereof. The reinforced rubber compound body can be favorably used as a bead core of a pneumatic tire.

The rubber composition for coating a steel wire material of the present invention is compounded with from 0.05 to 10 parts by weight of a salt compound per 100 parts by weight of a diene rubber, the salt compound including a dicarboxylic acid derived from a natural product and an amine of a decarboxylated amino acid derived from a natural product. Therefore, because an amine component act on the steel wire material, the rubber composition for coating a steel wire material of the present invention is able to improve initial adhesion strength and water resistant adhesion strength with respect to the steel wire material beyond conventional levels while using the salt compound including the dicarboxylic acid and the amine derived from natural products.

DETAILED DESCRIPTION

In the rubber composition for coating a steel wire material of the present invention, a diene rubber is used as a rubber component. The diene rubber is at least one type of rubber selected from a group consisting of natural rubber, isoprene rubber, butadiene rubber, styrene-butadiene rubber, and halogenated rubbers thereof. Among these, natural rubber is preferable. A single rubber may be used or multiple rubbers may be blended and used as the diene rubber.

In the present invention, initial adhesion strength and water resistant adhesion strength of the rubber composition for coating a steel wire material with respect to a steel wire material are improved beyond conventional levels by compounding a salt compound including a dicarboxylic acid derived from a natural product and an amine of a decarboxylated amino acid derived from a natural product. While an operating mechanism thereof is not clear, it is hypothesized that an amine component will increase initial adhesion strength and water resistant adhesion strength with respect to the steel wire material and that a salt compound including a dicarboxylic acid component will eliminate obstructions to vulcanization of an unvulcanized rubber caused by an addition of the amine component.

A compounded amount of the salt compound including the dicarboxylic acid and the amine derived from natural products is from 0.05 to 10 parts by weight and preferably from 0.5 to 5.0 parts by weight per 100 parts by weight of the diene rubber. If the compounded amount of the salt compound is less than 0.05 parts by weight, effects of increasing initial adhesion strength and water resistant adhesion strength with respect to the steel wire material cannot be sufficiently achieved. Additionally, if the compounded amount of the salt compound exceeds 10 parts by weight, an amount of the amine will be too great and unvulcanized physical properties and processability will be negatively affected.

The dicarboxylic acid derived from a natural product is not particularly limited, and examples thereof include oxalic acid, malonic acid, succinic acid, glutaric acid, adipic acid, pimelic acid, azelaic acid, sebacic acid, and the like. Of these, succinic acid, oxalic acid, and malonic acid are preferable.

Examples of the amine of a decarboxylated amino acid derived from a natural product include putrescine, cadaverine, agmatine, tryptamine, tyramine, histamine, dopamine, and the like. Of these, putrescine and cadaverine are preferable. Putrescine is produced by decarboxylizing 2,5-diaminopentanoic acid (ornithine) in the presence of ornithine decarboxylase. Cadaverine is produced by decarboxylizing 2,6-diaminohexane acid (lysine) in the presence of lysine decarboxylase. Other amines can also be produced by decarboxylizing their corresponding amino acids derived from natural products. Such amines can be prepared and used by obtaining an amino acid derived from a natural product and decarboxylizing the same through a regular method. Alternatively, a commercially available amine as mentioned above may be obtained and used.

With the salt compound for use in the present invention, regularly a number of moles of a carboxyl group and a number of moles of an amino group are equal. With the salt compound, the dicarboxylic acid derived from a natural product and the amine of a decarboxylated amino acid derived from a natural product can be synthesized by reacting them in the presence or absence of a solvent. A reaction temperature at this time, when synthesizing the salt compound in the presence of a solvent, can be determined as necessary based on a volatility and a stability of the dicarboxylic acid, the amine, and the solvent, and a solubility of the dicarboxylic acid and the amine in the solvent. When synthesizing the salt compound in an absence of the solvent, the reaction temperature can be determined as necessary based on a mutual solubility between the dicarboxylic acid and the amine.

Examples of the solvent for use in the synthesis reaction of the salt compound including the dicarboxylic acid and the amine are solvents in which both the dicarboxylic acid and the amine are soluble and can be easily separated from the produced salt compound through evaporation. Examples of such solvents include methanol, ethanol, acetone, 2-propanol, methyl ethyl ketone, hexane, diethylether, tetrahydrofuran, benzene, toluene, and the like.

An organic acid cobalt salt and/or organic acid cobalt salt containing boron may be compounded in the rubber composition for coating a steel wire material of the present invention. Initial adhesion strength and water resistant adhesion strength with respect to the steel wire material can be further increased by compounding such organic acid cobalt salts.

A compounded amount of the organic acid cobalt salt including organic acid cobalt salt and boron is not particularly limited, but an amount of cobalt is preferably from 0.1 to 0.3 parts by weight and more preferably from 0.15 to 0.25 parts by weight per 100 parts by weight of the diene rubber. If the compounded amount of the amount of cobalt of the organic acid cobalt salt is less than 0.1 parts by weight, initial adhesion strength and water resistant adhesion strength cannot be sufficiently improved. Additionally, if the amount of cobalt exceeds 0.3 parts by weight, water resistant adhesion strength with respect to the steel wire material will conversely decline.

The rubber composition for coating a steel wire material may include, in addition to the above components, carbon black or other reinforcing agents (fillers), vulcanizing or cross-linking agents, antiaging agents, plasticizers, resin components, and other various additives generally included in rubber compositions for coating a steel wire materials. These additives may be kneaded by a general method to obtain a composition which can then be used for vulcanization or cross-linking. Compounded amounts of these additives may be any conventional standard amount, so long as the objects of the present invention are not hindered.

The steel wire material to be coated by the rubber composition for coating a steel wire material of the present invention is not particularly limited and examples of the steel wire material include steel wires (single steel wires), steel cords (cords formed by twisting a plurality of steel wires together), and the like. Additionally, it is preferable that the steel wire material be a brass-plated wire or cord.

A reinforced rubber compound body formed by coating the steel wire material with the rubber composition for coating a steel wire material of the present invention can be widely used for industrial products such as pneumatic tires, conveyor belts, and the like. The reinforced rubber compound body has superior initial adhesion strength and water resistant adhesion strength with respect to the steel wire material. Especially, a reinforced rubber compound body formed by coating brass-plated steel wires with the rubber composition for coating a steel wire material and then bundling a plurality of these wires together can be favorably used as bead cores in pneumatic tires. Additionally, a reinforced rubber sheet formed by laying out a plurality of steel cords and coating them with the rubber composition for coating a steel wire material can be favorably used as carcass layers and/or belt layers of pneumatic tires.

Pneumatic tires provided with such carcass layers, belt layers, and/or bead cores will display improved tire durability due to superior initial adhesion strength and water resistant adhesion strength of the coated rubber with respect to the steel wire material.

The present invention is further explained below by examples. However, the scope of the present invention is not limited to these examples.

EXAMPLES

Synthesis of the Salt Compound Including the Dicarboxylic Acid and the Amine

Synthesis of Salt Compound 1 (Salt Compound Including Succinic Acid and Putrescine)

150 mL of acetone was added to a one-liter round-bottom flask with a stopper. Next, 60 g (0.508 mol) of succinic acid (special grade reagent chemical manufactured by Wako Pure Chemical Industries, Ltd.) and 44.8 g (0.508 mol) of putrescine (special grade reagent chemical manufactured by Wako Pure Chemical Industries, Ltd.) was added thereto, and a precipitate formed after reacting for five minutes at room temperature. Thereafter, the mixture was stirred for five hours until reaction heat dissipated. By filtering the precipitate and drying it under reduced pressure, 96.4 g (yield: 92%) of a powdered light-brown product was obtained. The light-brown product was analyzed using the nuclear magnetic resonance (NMR) spectroscopy method ($^1$H-NMR and $^{13}$C-NMR; AV400M (400 MHz) NMR spectrometer manufactured by Bruker Corporation; solvent used was dimethyl-d6 sulfoxide) and elemental analysis (2400 Series II CHNS/O Elemental Analyzer manufactured by PerkinElmer Inc.; temperature of 1,800° C. or higher; combusted completely in oxygen; frontal chromatography was used to quantify each of the following elements: carbon, hydrogen, nitrogen, and oxygen). It was confirmed that a ratio of the succinic acid to the putrescine in the salt compound was 1:1.

Synthesis of Salt Compound 2 (Salt Compound Including Succinic Acid and Cadaverine)

150 mL of acetone was added to a one-liter round-bottom flask with a stopper. Next, 60 g (0.508 mol) of succinic acid (special grade reagent chemical manufactured by Wako Pure Chemical Industries, Ltd.) and 51.9 g (0.508 mol) of cadaverine (special grade reagent chemical manufactured by Wako Pure Chemical Industries, Ltd.) was added thereto, and a precipitate formed after reacting for five minutes at room temperature. Thereafter, the mixture was stirred for five hours until reaction heat dissipated. By filtering the precipitate and drying it under reduced pressure, 101.8 g (yield: 91%) of a powdered light-brown product was obtained. The light-brown product was analyzed using the aforementioned nuclear magnetic resonance (NMR) spectroscopy method and elemental analysis. It was confirmed that a ratio of the succinic acid to the cadaverine in the salt compound was 1:1.

Synthesis of Salt Compound 3 (Salt Compound Including Succinic Acid and Cyclohexylamine)

150 mL of acetone was added to a one-liter round-bottom flask with a stopper. Next, 60 g (0.508 mol) of succinic acid (special grade reagent chemical manufactured by Wako Pure Chemical Industries, Ltd.) and 100.7 g (1.016 mol) of cyclohexylamine (special grade reagent chemical manufactured by Wako Pure Chemical Industries, Ltd.) was added thereto, and a precipitate formed after reacting for five minutes at room temperature. By filtering the precipitate, washing the precipitate remaining on the filter paper twice with acetone, and drying under reduced pressure, 159.1 g (yield: 99%) of a powdered white product was obtained. A melting point of the white product was 199.3° C. The white product was analyzed using the aforementioned nuclear magnetic resonance (NMR) spectroscopy method and elemental analysis. It was confirmed that a ratio of the succinic acid to the cyclohexylamine in the salt compound was 1:2.

Examples 1 to 7

Components for nine types (Examples 1 to 7 and Comparative examples 1 and 2) of rubber compositions for coating steel wire materials having the formulations shown in Table 1, with the exception of sulfur, vulcanization accelerators, the partial condensate of hexamethylolmelaminepentamethyl ether and the salt compound including the dicarboxylic acid and the amine, were kneaded for three to five minutes in a 1.8 L internal mixer. The mixture was discharged as a master batch and the sulfur, the vulcanization accelerators, and the partial condensate of hexamethylolmelaminepentamethyl ether or the salt compound including dicarboxylic acid and amine shown in Table 1 were added and kneaded in an eight inch open roll to obtain the rubber compositions for coating steel wire materials.

Next, rubber sheets formed from the obtained rubber compositions for coating steel wire materials were used to mold unvulcanized sheets by sandwiching brass-plated steel cords (1×6 construction; manufactured by Tokyo Rope Manufacturing Co., Ltd.) laid out parallely at intervals of 12.7 mm so that an embedded length of the steel cords in the rubber sheets was 12.7 mm. The unvulcanized sheets were vulcanized for twenty minutes at 160° C. Adhesive test samples were then prepared according to ASTM D2229. The initial adhesion strength and water resistant adhesion strength of the obtained adhesion test samples were then evaluated according to the following methods.

Initial Adhesion Strength

Using the obtained adhesion test samples, a steel cord pull-out test was performed in accordance with ASTM D2229 and a proportion (area proportion of rubber stuck to a surface of the cord) of rubber sticking to a surface of the pulled-out steel cord was measured. The obtained results were recorded in Table 1 as an index with a value for Comparative example 1 being 100. A larger index value indicates a larger proportion of stuck rubber and superior initial adhesion strength.

Water Resistant Adhesion Strength

The obtained adhesion test samples were subjected to hygrothermal aging for two weeks under the following conditions: Temperature=70° C., Humidity=96%. The hygrothermally aged adhesion test samples were used and the rubber sticking proportions were evaluated according to the aforementioned method. The obtained results were recorded in Table 1 as an index with a value for Comparative example 1 being 100. A larger index value indicates superior water resistant adhesion strength.

TABLE 1

|  |  | CE 1 | CE 2 | Ex 1 | Ex 2 | Ex 3 | Ex 4 | Ex 5 | Ex 6 | Ex 7 |
|---|---|---|---|---|---|---|---|---|---|---|
| NR | PBW | 100 | 100 | 100 | 100 | 100 | 100 | 100 | 100 | 100 |
| CB | PBW | 60 | 60 | 60 | 60 | 60 | 60 | 60 | 60 | 60 |
| Zinc oxide | PBW | 10 | 10 | 10 | 10 | 10 | 10 | 10 | 10 | 10 |
| Antiaging agent 1 | PBW | 1 | 1 | 1 | 1 | 1 | 1 | 1 | 1 | 1 |
| Antiaging agent 2 | PBW | 1 | 1 | 1 | 1 | 1 | 1 | 1 | 1 | 1 |
| Co salt | PBW | 2 | 2 | 2 | 2 | 2 | 2 | 2 | 2 | 2 |
| Cresol resin | PBW | 1 |  |  |  |  |  |  |  |  |
| Sulfur | PBW | 7.5 | 7.5 | 7.5 | 7.5 | 7.5 | 7.5 | 7.5 | 7.5 | 7.5 |
| Vulcanization accelerator | PBW | 0.5 |  |  |  |  |  |  |  |  |
| Partial condensate | PBW | 3.5 |  |  |  |  |  |  |  |  |
| Salt compound 1 | PBW |  |  | 0.5 | 1 | 1.5 | 2 | 8 |  |  |
| Salt compound 2 | PBW |  |  |  |  |  |  |  | 0.5 | 2 |
| Salt compound 3 | PBW |  | 1 |  |  |  |  |  |  |  |
| Adhesion strength performance | Index | 100 | 100 | 100 | 100 | 101 | 103 | 100 | 102 | 103 |
| Water resistant adhesion | Index | 100 | 98 | 112 | 113 | 113 | 111 | 104 | 109 | 110 |

TABLE 1-continued

| | CE 1 | CE 2 | Ex 1 | Ex 2 | Ex 3 | Ex 4 | Ex 5 | Ex 6 | Ex 7 |
|---|---|---|---|---|---|---|---|---|---|
| strength performance | | | | | | | | | |

* As used in Table 1, "CE" is an abbreviation for "Comparative Example", "Ex" is an abbreviation for "Example", and "PBW" is an abbreviation for "Parts By Weight".

The types of raw materials used in Table 1 are shown below.

NR: Natural rubber; RSS #3

CB: Carbon black; SEAST KH (manufactured by Tokai Carbon Co., Ltd.); Iodine absorption number 90 cm³/100 g; DBP absorption number 119×10⁻⁵ m³/kg Zinc oxide: Zinc Oxide #3 (manufactured by Seido Chemical Industry Co., Ltd.)

Antiaging agent 1: Antiaging agent PPD; Santoflex 6PPD (manufactured by Flexsys.)

Antiaging agent 2: Antiaging agent RD; Nocrac 224 (manufactured by Ouchi Shinko Chemical Industrial Co., Ltd.)

Co salt: Boron-containing organic acid cobalt salt; Manobond® (manufactured by Rhodia); Co content: 22 weight %; Chemical formula: $(C_9H_{19}CoO)_3B$ Cresol resin: Sumikanol 610 (manufactured by Sumitomo Chemical Co., Ltd.)

Sulfur: Insoluble sulfur; Crystex HS OT 20 (manufactured by Flexsys)

Vulcanization accelerator: N,N'-dicyclohexyl-2-benzothiazolylsulfenamide; Nocceler CZ-G (manufactured by Ouchi Shinko Chemical Industrial Co., Ltd.)

Partial condensate: Partial condensate of hexamethylolmelaminepentamethyl ether; Sumikanol 507A (manufactured by Sumitomo Chemical Co., Ltd.)

Salt compound 1: Salt compound including succinic acid and putrescine, prepared according to the aforementioned method.

Salt compound 2: Salt compound including succinic acid and cadaverine, prepared according to the aforementioned method.

Salt compound 3: Salt compound including succinic acid and cyclohexylamine, prepared according to the aforementioned method.

What is claimed is:

1. A rubber composition for coating a steel wire material comprising from 0.05 to 10 parts by weight of a salt compound per 100 parts by weight of a diene rubber, the salt compound comprising succinic acid and an amine selected from the group consisting of putrescine and cadaverine.

2. The rubber composition for coating a steel wire material according to claim 1, wherein sheets of the rubber composition cover a plurality of laid-out steel cords to form a reinforced rubber sheet.

3. The rubber composition for coating a steel wire material according to claim 1, wherein the rubber composition is coated on bundles of a plurality of steel wires to form a reinforced rubber compound body.

4. A pneumatic tire having a carcass layer and/or a belt layer comprised by the reinforced rubber sheet according to claim 2.

5. A pneumatic tire having a bead core comprised by the reinforced rubber compound body according to claim 3.

6. The rubber composition for coating a steel wire material according to claim 1, comprising from 0.05 to 5 parts by weight of the salt compound per 100 parts by weight of the diene rubber.

7. The rubber composition for coating a steel wire material according to claim 1, wherein the salt compound further comprises a compounded organic acid cobalt salt compound including organic acid cobalt salt and boron, and wherein an amount of cobalt salt is from 0.1 to 0.3 parts by weight per 100 parts by weight of the diene rubber.

8. The rubber composition for coating a steel wire material according to claim 7, wherein the amount of cobalt salt is from 0.15 to 0.25 parts by weight per 100 parts by weight of the dime rubber.

9. The pneumatic tire according to claim 4, wherein the rubber composition for coating the steel wire material comprises from 0.05 to 5 parts by weight of the salt compound per 100 parts by weight of the diene rubber.

\* \* \* \* \*